Figure 1:
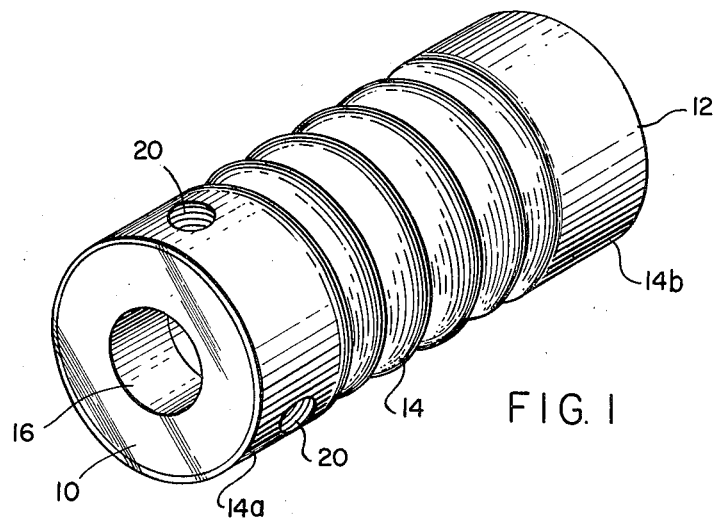

June 29, 1965   R. SHAMIE   3,191,285
METHOD OF MAKING PLATED CONSTRUCTION SHAFT COUPLING
Filed Feb. 27, 1963

INVENTOR.
RAYMOND SHAMIE
BY
*Blair & Buckles*
ATTORNEYS

United States Patent Office 3,191,285
Patented June 29, 1965

3,191,285
METHOD OF MAKING PLATED CONSTRUCTION SHAFT COUPLING
Raymond Shamie, Norwood, Mass., assignor to Metal Bellows Corporation, Wellesley, Mass.
Filed Feb. 27, 1963, Ser. No. 261,371
2 Claims. (Cl. 29—423)

The present invention relates to the flexible shaft coupling art. More particularly, it relates to an improved method for fabricating flexible shaft couplings which employ plated bellows. The invention is particularly directed to achieving a permanent, intimate bond between the plated bellows and the hubs.

Flexible shaft couplings of the type employing metallic bellows have been known for some time. The bellows is utilized as the flexible member for coupling shafts which are not in exact alignment. It is important that the bellows be extremely flexible so that the ends thereof may be readily offset without developing significant lateral stresses on the shafts being coupled. Of equal importance is the requirement that the bellows have sufficient torsional rigidity that the ends thereof are not rotated relative to each other as the shafts are loaded. In other words, it is desirable that rotational movement of the driving shaft be positively communicated to the driven shaft without having to overcome any slack or play in the coupling.

In order to fabricate a metallic bellows having the desired degrees of flexibility and torsional rigidity, it is often necessary to strike a compromise as to the wall thickness of the bellows. This is due to the fact that the torsional rigidity is directly proportional to the wall thickness, while flexibility is inversely proportional to the wall thickness. One method of fabricating a bellows having the desired wall thickness is by a plating process. A mandrel machined with the desired bellows configuration is plated with the material of which the bellows is to be made. The mandrel is then melted or dissolved away, leaving the plating, which serves as the bellows. This technique is well known.

A significant problem arises, however, from the fact that it is extremely difficult to attach the ends of a plated bellows to hubs which are adapted to receive the shafts to be coupled. It is important that the attachment between the bellows and the hubs remain steadfast in order to prevent relative rotation of the coupled shaft. Attaching the ends of the bellows by soldering, brazing or other means to the hubs has proved unsatisfactory because of the thinness of the wall of the bellows and high stress concentrations.

It is therefore an object of the present invention to provide a method for fabricating an improved flexible shaft coupling of the metallic bellows type in an economical and simplified manner.

An additional object is to provide a method for achieving a permanent and intimate bond between the hubs and the ends of a plated bellows of a flexible shaft coupling.

It is a further object of the present invention to provide a novel method for assembling a flexible shaft coupling by which a permanent and intimate bond between the hubs and the ends of a plated bellows is achieved in a practical manner.

Other objects of the invention will in part be obvious and will in part appear hereinafter.

The inventor accordingly comprised the several steps and the relation of one or more steps with respect to each of the others thereof, which will be exemplified in the method hereinafter disclosed, and the scope of the invention will be indicated in the claims.

Figure 2:
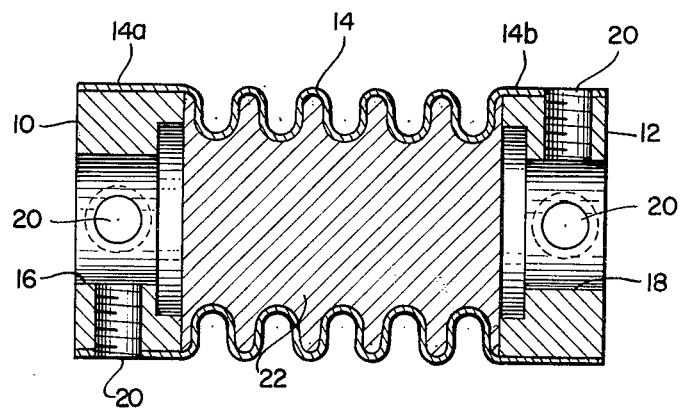

For a fuller understanding of the nature and objects of the invention, reference should be had to the following detailed description taken in connection with the accompanying drawing, in which:

FIG. 1 is a perspective view of a flexible shaft coupling fabricated according to the invention, and FIG. 2 is a cross-sectional view of the flexible shaft coupling of FIGURE 1.

In general, according to the present invention, the formation of the bellows and the attachment of the ends thereof to the hub are achieved in the same operation. The hubs are spaced apart by a cylindrical forming member or mandrel having an outer surface configuration conforming to the desired shape of the bellows. The hubs and the cylindrical forming member are disposed in substantial axial alignment so that the member and the hubs form a continuous circumferential surface upon which the bellows is plated. The mandrel is subsequently removed in a well-known manner, e.g. by chemical etching. It is found that by plating the ends of the bellows directly on the outer circumferential surface of the hubs, a permanent and intimate bond is created therebetween.

In FIGS. 1 and 2, there is shown a pair of hubs 10 and 12 interconnected by a plated bellows 14 formed of a platable metal such as nickel. End portions 14a and 14b of the bellows 14 extend over and are bonded to the circumferential surfaces of the hubs 10 and 12, respectively. Central bores 16 and 18 are provided in the hubs for receiving the ends of the shafts (not shown) to be coupled. A plurality of threaded holes 20 extend radially through each of the hubs and the bellows end portions 14a and 14b for receiving set screws (not shown) which are advanced into engagement with the shaft ends to prevent the shafts from turning within the bores 16 and 18.

Hitherto, the bellows has been formed separately by plating a metal such as nickel on a cylindrical mandrel or form having a corrugated external surface corresponding to the desired shape of the bellows. The mandrel is of aluminum or other etchable or thermo-disintegrating material whose surface is electrically conductive. Upon completion of the plating process, the mandrel is removed from the interior surface of the plated bellows by an etching process, or by a thermal process in the event the mandrel material is one that can be melted at a temperature below the critical temperature at which the bellows would be melted or damaged.

After the bellows was cleaned and otherwise treated, the hubs were attached to the ends of the bellows by conventional means.

In accordance with the invention, and as seen in FIG. 2, a mandrel 22 is axially aligned between the hubs 10 and 12 prior to the plating operation. The mandrel is dimensioned so that the outer diameter of the ends thereof corresponds to the outside diameter of the hubs. The hubs are held against the ends of the mandrel and combined therewith to provide a continuous circumferential surface upon which the bellows 14 is plated. The end and interior surfaces of the hubs may be coated in a well-known manner to prevent the deposition of the plating, thereon. As an alternative, the hubs may be dimensioned to account for the subsequent plating.

Since the end portions 14a and 14b of the bellows are plated directly on the circumferential surface of the hubs, a permanent intimate bond therebetween is achieved. The entire coupling assembly is then subjected to an etching process to remove the mandrel 20 in the same manner as in the past when the bellows was formed separately. This etching process is selective so that the mandrel will be removed without damaging the bellows or the hubs. The couplings may then be further treated in order to give the bellows desired physical characteristics. The mandrel may be solid or merely a cylindrical surface depending upon the manner in which it is to be formed.

Obviously the mandrel may be molded or tooled into the desired surface configuration.

As is well known in the plating art, certain plating materials adhere to some substrates better than they adhere to others. Therefore the material of the surfaces of the hubs 10 and 12 on which the bellows 14 is plated should be chosen with the strength of the plating bond in mind. For example, if the bellows 14 is to be made of nickel, the hubs 10 and 12 may be of brass or steel to provide a strong, permanent bond.

The invention thus provides an improved method for fabricating a flexible shaft coupling, and in particular, the problems hitherto encountered in the attachment of the ends of a plated bellows to the hubs have now been overcome. As contemplated by the invention, the formation of the bellows and the attachment of the ends thereof are achieved in the same operation. This is accomplished by plating the end portions of the bellows on the circumferential surfaces of the hubs at the same time that the body of the bellows is plated on the surface of the mandrel. It should be noted that, in addition to the advantages set forth above, the method eliminates the separate operation previously required for attachment of the bellows to the hubs, thereby effecting a material saving in the cost of fabrication. Moreover, virtually all assemblies made in this manner are fully acceptable, as compared to the significant reject rate previously encountered.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A method for fabricating a flexible shaft coupling having an elongated plated bellows with end portions thereof attached to a pair of metallic hubs, said method comprising the steps of spacing said hubs a predetermined distance apart, providing a removable bellows forming means and an electrically conducting surface in the space between said hubs, said surface and said hubs comprising a continuous bellows forming surface, plating in continuous fashion over said electrically conducting surface and the surface of said hubs, thereby connecting said bellows end portions to said hubs, and removing the bellows forming means.

2. In the method of fabricating a flexible shaft coupling of the type having a pair of hubs attached to end portions of a bellows, wherein said bellows is formed by plating on the external conducting surface of a bellows forming means including a removable mandrel, the improvement comprising the steps of aligning said bellows forming means between said hubs, said conducting surface and said hubs forming a continuous bellows forming surface, forming said bellows by plating on said conducting surface and said hubs, thereby connecting said bellows end portions to said hubs, and removing said mandrel.

References Cited by the Examiner

UNITED STATES PATENTS

| | | | |
|---|---|---|---|
| 1,648,046 | 11/27 | Fulton | 29—423 |
| 2,608,529 | 8/52 | Varian | 204—16 |
| 3,040,426 | 6/62 | Hamren | 29—423 |

WHITMORE A. WILTZ, *Primary Examiner.*

THOMAS H. EAGER, *Examiner.*